J. G. RODGER.
GERMINATOR.
APPLICATION FILED FEB. 28, 1921.
1,380,253.
Patented May 31, 1921.
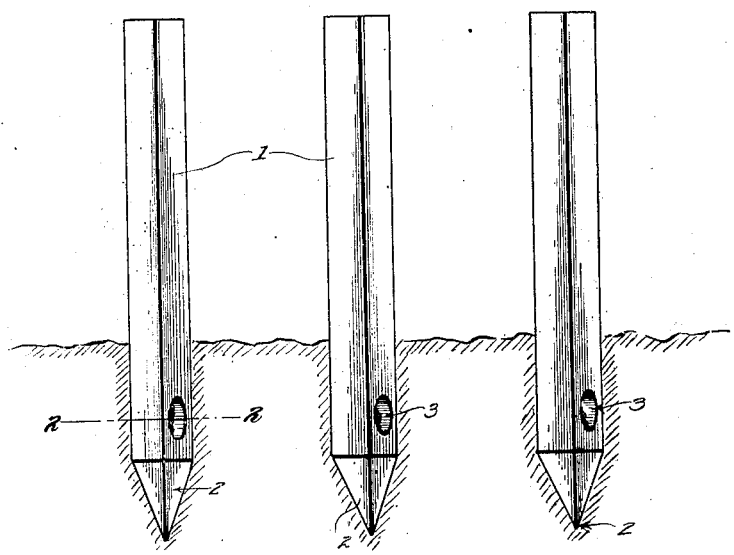
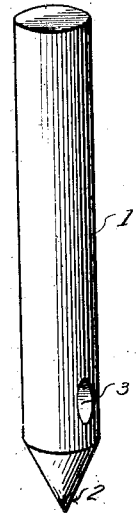
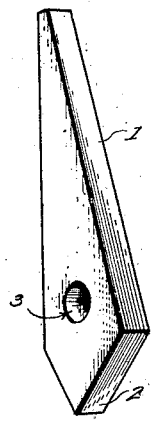
J. G. Rodger, Inventor
Attorney

UNITED STATES PATENT OFFICE.

JAMES G. RODGER, OF CAMDEN, NEW JERSEY.

GERMINATOR.

1,380,253.

Specification of Letters Patent.  Patented May 31, 1921.

Application filed February 28, 1921. Serial No. 448,321.

*To all whom it may concern:*

Be it known that I, JAMES G. RODGER, a citizen of the United States of America, residing at Camden, in the county of Camden and State of New Jersey, have invented certain new and useful Improvements in Germinators, of which the following is a specification.

This invention relates to a germinator designed more particularly as an educational appliance, in that through the use of this particular germinator the normal development of seed may be made the subject of study and instruction with the utmost convenience.

The germinator proper comprises a rod-like member formed near one end with a bowl-like recess, designed to receive soil with the seed embedded therein. The germinator may be then forced into soil of any character, to a point above the bowl-like recess, with the remainder, and greater length, of the germinator extending above the surface. The development of the seed in a particular germinator may be readily inspected by simply removing that germinator from the soil, and returning it to the soil if desired after inspection and study.

In the drawings:—

Figure 1 is a view illustrative of the use of the improved germinator.

Fig. 2 is a section on line 2—2 of Fig. 1.

Figs. 3 and 4 are perspective views of different styles of germinators.

The germinator comprises a rod 1 of appreciable length, having one end pointed or sharpened as at 2. The rod is formed near the pointed end with a bowl-like recess 3, which preferably does not extend through to the opposite surface. If desired however, the recess 3 may extend entirely through the rod without departing from the spirit of the invention.

The rod 1 may be of any desired sectional shape, as for example, rectangular as shown in Fig. 1, round as shown in Fig. 3, or angular as shown in Fig. 4. These shapes are intended to illustrate that in this detail of the invention the rod may have any desired sectional configuration, or as will be plain from Fig. 4 may be of irregular shape in elevation.

The requisite details are that the rod must be capable of being readily inserted into the ground, hence the pointed end; must have a means for supporting the soil and seed as a part of the rod, hence the bowl-like recess; and must be capable of being readily inserted into and withdrawn from the ground, hence the extended length of the rod above the soil receiving bowl.

In use of the germinator as an educational appliance, a number of such, as desired, are supplied with seed and soil in the manner described, and are then inserted into the ground, under natural conditions, and allowed to remain a determinate length of time. Any particular germinator or germinators may be readily removed from the soil and the condition of the seed, that is, their development or germination inspected and explained, in the event of student instruction.

Of course the invention is as readily applicable for determining the effect of particular soil or soils on seed, this use also defining its scope as an educational appliance.

The device is particularly designed and readily lends itself to an educational function not conveniently possible with germinators heretofore proposed. For example, a series of germinators of the type herein described may be supplied with similar soil and seeds, and planted in a row or otherwise at the same time. The instructor can then remove the devices in succession and at recurrent periods of time, to thereby demonstrate to the class under instruction, the periodic germination and development of the seed for the successive periods selected. Each device may be labeled to indicate the germination period, as, for example, one day—two days—three days, et cetera, or may be simply removed in successive order.

Claims:

1. A germinator for use as an educational appliance, comprising a rod-like member having a recess formed therein near one end for the reception of soil and seed, the length of the rod above the recess serving as a handle to permit the introduction of the germinator into and its withdrawal from the ground.

2. A germinator for use as an educational appliance, comprising a rod-like member having a pointed end and formed with a bowl-like recess near the pointed end, the length of the rod above the recess serving as a handle to permit the introduction of the germinator into and its withdrawal from the ground.

In testimony whereof I affix my signature.

JAMES G. RODGER.